United States Patent
Assouline et al.

[15] 3,663,086
[45] May 16, 1972

[54] OPTICAL INFORMATION STORING SYSTEM

[72] Inventors: George Assouline; Eugene Leiba; Erich Spitz, all of Paris, France

[73] Assignee: Thomson-CSF

[22] Filed: June 23, 1970

[21] Appl. No.: 49,012

[30] Foreign Application Priority Data

July 2, 1969 France..................................6922335

[52] U.S. Cl..............................350/150, 350/154, 350/155, 350/160, 340/173 LM
[51] Int. Cl........................................................G02f 1/18
[58] Field of Search........................350/160, 150, 154, 155; 340/173 LM

[56] References Cited

UNITED STATES PATENTS

| | | | |
|---|---|---|---|
| 3,551,026 | 12/1970 | Heilmeier | 350/150 |
| 3,064,134 | 11/1962 | Kell | 350/160 P |
| 3,475,736 | 10/1969 | Kurtz | 350/150 |

FOREIGN PATENTS OR APPLICATIONS

1,123,117  8/1968  England..................................350/160

OTHER PUBLICATIONS

"Liquid Crystals & their Applications," by Fergason et al., Electro-Technology, 1/70, pp. 41-50.
" Liquid Crystal Image Intensifier & Recorder," B. Kazan, IBM Tech. Discl. Bul., Vol. 12, No. 6, 11/69 pp. 864- 865.

Primary Examiner—Ronald L. Wibert
Assistant Examiner—Jeff Rothenberg
Attorney—Cushman, Darby & Cushman

[57] ABSTRACT

An optical information storing system comprises a thin photoconductive film and a thin film of a mixture of nematic liquid crystal and dichroic dye, placed side by side between two transparent electrodes. A direct voltage V is applied between said electrodes. The data to be stored are projected optically onto the photoconductive film with a radiation to which the photoconductor is sensitive. The mixture film is illuminated by an auxiliary radiation which is rectilinearly polarized and has a wavelength corresponding to an optical absorption line of the dichroic dye, the photoconductor being sensitive to this radiation.

4 Claims, 7 Drawing Figures

OPTICAL INFORMATION STORING SYSTEM

The present invention relates to a device for storing optical information, which utilizes liquid crystals.

Liquid crystals are substances which, within a certain temperature range, exhibit, when forming a thin film, special arrangements of elongated molecules depending upon whether they belong to one of the following classes: smectic, cholesteric or nematic.

In the nematic structure, which is concerned here, the molecules are arranged parallel to one another. The medium obtained is thus optically anisotropic. Moreover, the orientation of the molecules, and therefore the direction of the optical axis, can be modified by the application of an electric field.

The molecules of a dichroic substance, added to a nematic substance, align themselves parallel to the molecules of the nematic substance. The resulting medium is thus itself dichroic and this property can be modified by the application of an electric field. A suitably polarized light wave will be absorbed by it. If then an electric field (in the order of $10^4$ V/cm in the case of a layer having a thickness of about 10 microns) is applied in the direction of propagation of the light, the orientation of the molecules will change and the wave will cease to be absorbed. A variable transparency medium has thus been created. This phenomenon is described in greater detail in a paper by G.H. Heilmeier and L.A. Zanoni in Applied Physics Letters, vol. 13, no: 3, August 1, 1968, pages 91 and 92, which article is entitled "Guest-host inter-actions in nematic liquid crystals. A new electro-optic effect."

It is an object of the invention to exploit this phenomenon with the view of creating a storage device for storing and reconstituting in optical form, information which is supplied to it in this form.

According to the invention there is provided an optical information storing system comprising: a first constant thickness layer of a mixture of nematic liquid crystal and of a dichroic substance, said substance exhibiting at least one optical absorption line with respect to rectilinearly polarized light; a second constant thickness layer of photoconductive material located against said first layer; two transparent electrodes for enclosing said layers; first means for coupling said electrode to a d.c. supply source; optical means for projecting said optical information onto said photoconductive layer; and second means for illuminating substantially uniformly said first layer by a beam of polarized light comprising at least a light radiation having a wavelength substantially equal to the wavelength of said absorption line.

For a better understanding of the invention and to show how the same may be carried into effect, reference will be made to the drawings accompanying the ensuing description and in which.

Figure 3:
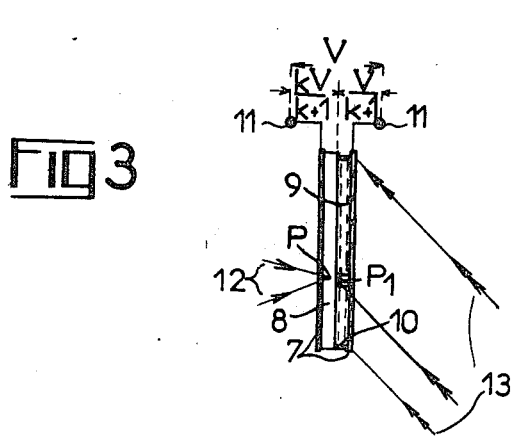
Figure 4:
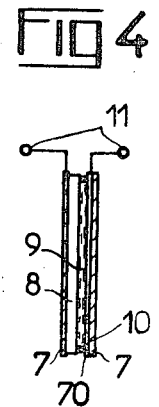

FIG. 3 schematically illustrates a memory element in accordance with the invention;

FIG. 4 illustrates a variant embodiment of the element shown in FIG. 3; and

Figure 5:
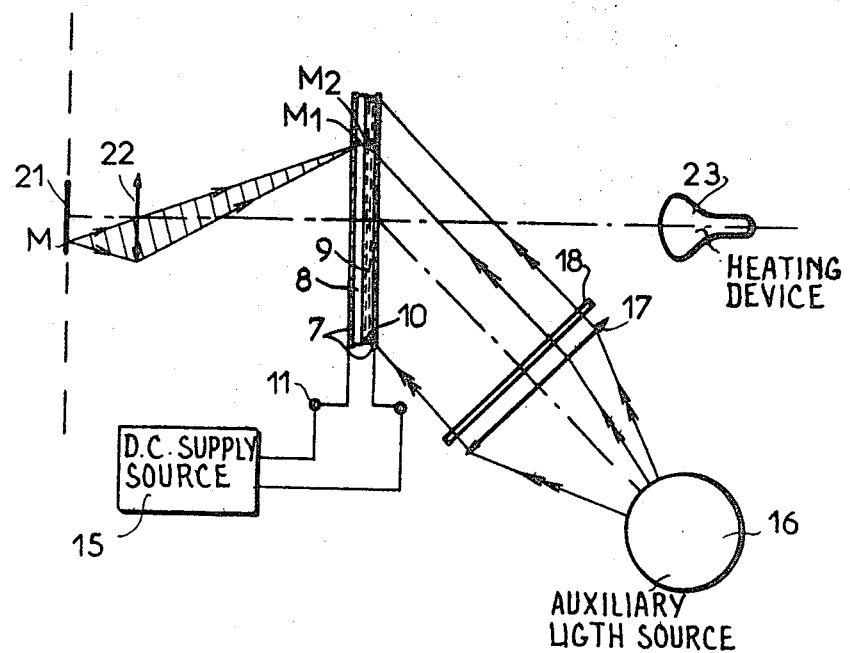

FIG. 5 illustrates an embodiment of the memory device in accordance with the invention.

As is known, a dichroic substance is a substance whose optical absorption spectrum of rectilinearly polarized light radiation, is closely dependent upon the molecular orientation of said substance in relation to the direction of polarization of said light radiation. For example, where the directions of orientation of the molecules and that of the light polarization are parallel to one another, one or more absorption lines are obtained at wavelengths within the optical absorption spectrum of the substance, which lines substantially disappear if the direction of polarization of the light is made perpendicular to the direction of molecular orientation. This property has been used to obtain a novel electro-optical effect by acting upon the orientation of the molecules of dichroic substances through the medium of molecules of other substances with which said dichroic molecules are mixed, said other substances being such that their molecules can be orientated in controlled fashion by the action of an electric field, namely molecules of liquid crystals in the nematic state. This phenomenon has been described in more detail in the aforedescribed article and requires no detailed description here.

Figure 1A:
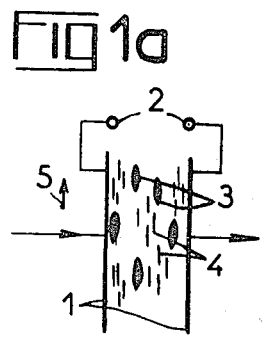
FIGS. 1a and 1b are explanatory diagrams of the phenomenon exploited.

Let the device shown in section and on a much enlarged scale in FIG. 1a be considered.

Between two transparent electrodes 1, connected to terminals 2, is formed a thin layer of a mixture of molecules of nematic liquid crystal 4 and molecules of dichroic substance 3. The arrangement is illuminated by a beam of rectilinearly polarized light whose direction of polarization, illustrated by the vector 5, is parallel to the plane of the electrodes 1.

Figure 1B:
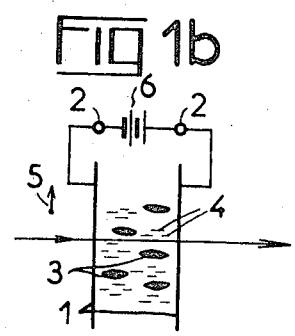

In the absence of any voltage applied between the electrodes 1, the molecules of liquid crystal have their longitudinal axes substantially parallel to one another and to the plane of the electrodes. In these circumstances, the graph plotting the absorption coefficient A of the mixture as a function of the wavelength of the radiation propagating through said mixture, has substantially the form shown in FIG. 2a. There is an absorption line at the wavelength $\lambda_c$, which wavelength depends upon the dichroic substance used. If, now, a d.c. voltage source 6 is arranged between the terminals 2 in order to apply to the mixture an electric field in the order of some tens of kV/cm (FIG. 1b), then the molecules 4 of the liquid crystal will all align themselves perpendicularly to the electrodes 1 producing a similar orientation in the molecules 3 of the dichroic substance.

Figure 2A:
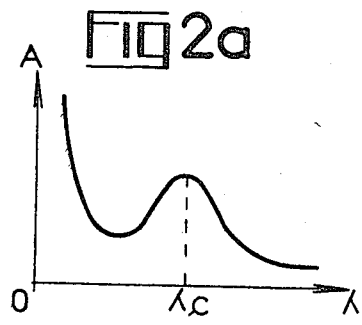
FIGS. 2a and 2b are explanatory graphs.
Figure 2B:
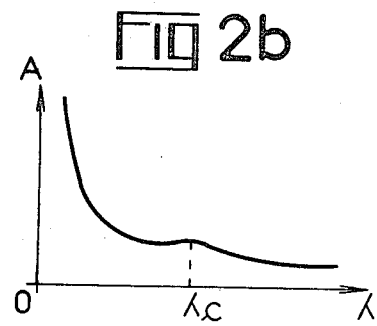

Under these conditions, the absorption curve has substantially the form shown in FIG. 2b. The absorption line at the wavelength $\lambda_c$ has virtually disappeared and becomes less and less obvious the higher the applied field strength.

By utilizing PN butoxybenzoic acid as the nematic liquid crystal, and methyl red as the dichroic colorant in a solution of 1 percent by weight in the acid, an absorption line is obtained at $\lambda_c = 4,825$ A. and the application of a field in the order of 40 kV/cm changes the color of the mixture from reddish-orange to yellow if the system is observed by transmission using polarized white light as the illuminating source.

In accordance with the invention, this phenomenon is exploited in order to create an optical storage device illustrated in section in FIG. 3. Between two flat, parallel and transparent electrodes 7, there are arranged a thin film 8 of a photoconductive material and a thin film 9 of the mixture of liquid crystal and dichroic substance. The photoconductor may be of the kind used in vidicon tubes (selenium, antimony trisulphide, lead oxide) or gallium arsenide, lead sulphide, indium antimonide and so on, and is to be selected so that it is sensitive to the wavelength $\lambda_c$ of the dichroic substance used. The film 9 is applied to a smooth face of the photoconductive film 8 and has a thickness in the order of 10 $\mu$.

The thickness of the film 8 is selected in a manner which will be described later on. Spacers 10, for example of polytetrafluoroethylene (e.g.TEFLON), provide appropriate spacing between the electrode and the film 8. The capillary forces suffice to keep the liquid crystal layer and the dichroic substance in position whatever the attitude of the arrangement.

A d.c. voltage V is applied between the terminals 11 connected to the electrodes 7. The film 9 is illuminated by an auxiliary beam 13 of light having a wavelength $\lambda_c$ polarized rectilinearly and parallel to the planes of the electrodes 7. Under the effect of the illumination of a region P of the photoconductive film 8 by a radiation 12 to which the photoconductor is sensitive, the corresponding region $P_1$ of the film 9 becomes transparent and an observer will see this change in transparency in a manner which will be explained in greater detail hereinafter.

The operation of the system is as follows:

The wavelength of the polarized radiation 13 is selected to be substantially equal to $\lambda_c$, this corresponding to the absorption line of the dichroic substance used (FIG. 2a).

If a voltage V is applied between the terminals 11, and calling $k$ the ratio of the respective impedances of the films 8 and 9 for a given illumination of the photoconductive film, then the voltage between the two faces of the film 9 will be equal to $V/(k+1)$.

If the photoconductive film is not illuminated, the ratio $k$ has a value $k_1$. If the region P of the photoconductor is illuminated by a radiation 12 of given intensity, the ratio $k$ in this region will change to $k_2$. The thickness of the photoconductive film 8 and the voltage V are selected in such fashion that, in the absence of any illumination of the film 8 (ratio of the impedances of films 8 and 9 equal to $k_1$), the field applied to the mixture of liquid crystal and dichroic substance is sufficiently weak for the absorption line of FIG. 2a to persist, while on the other hand, for an illuminated zone P (ratio of the impedances equal to $k_2$), the field applied to the mixture is sufficiently strong to erase substantially said line (FIG. 2b).

Under these circumstances, if the photoconductor is not illuminated, the beam 13 will be absorbed by the mixture of liquid crystal and dichroic substance. If a region P of the photoconductor is illuminated by the radiation 12, the corresponding region $P_1$ of the film 9 will become substantially transparent to the beam 13. Then, that portion of the beam 13 which passes through the region $P_1$, will ultimately reach the photoconductive film 8. Because of the sudden variation in the refractive index between the films 8 and 9, part of this portion of the beam is reflected by the metal layer 8 back to the observer whereas the other part is absorbed by the region P of the photoconductive film 8 and serves to keep this region conductive ($k$ kept at the value $k_2$) even if the illumination 12 is cut off.

The region $P_1$ thus appears bright and its brightness is maintained by the light beam 13. The light information transmitted by the beam 12 is thus stored and is available until the illumination 13 is cut off or the voltage V likewise, this enabling the erasing of all the stored information.

By way of example, if the above-indicated mixture of PN butoxybenzoic acid and methyl red is used in a film 12 /μ in thickness, this film is rendered transparent by an applied field in the order of 40 kV/cm or a voltage in the order of 48 V. On the other hand, if selenium is used as the photoconductor, this having a resistivity in darkness in the same order ($10^{12} \Omega.cm$) as that of the mixture of liquid crystal and dichroic colorant, a film 8 of the same thickness as the film 9 will be used. Under these conditions, $k_1$ is approximately equal to 1 and the voltage V is made equal to 50 V, this giving in the dark condition a voltage of 25 V across the terminals of the film 9.

Then, the strength of the recording beam 12 is selected so that the resistivity of the photoconductor is approximately divided by 25, giving the desired value for the field to be applied to the film 9.

In the case of certain liquid crystals, a current may flow between the electrodes 7. However, this interferes with proper exploitation of the phenomenon involved and thus with the quality of the stored image. To prevent this from happening, it is possible to interpose (FIG. 4) a transparent insulating layer or film 70, for example between the film 9 and the corresponding electrode 7. For example, a film of mylar can be used which can also be employed in the construction of the electrode 7 itself by metalizing the external face of the mylar film 70.

In FIG. 5, a complete embodiment of a storage device in accordance with the invention has been shown.

Reference numerals which are the same as those used in FIG. 3, relate to the same elements.

A voltage source 15 is connected across the terminals 11. This source can produce a d.c. voltage or a rectangular waveform voltage if it is desired to carry out erasing at regular intervals.

A light source 16, a lens 17 and a polarizer 18 which rectilinearly polarizes the light perpendicularly to the plane of the figure, produce the desired light beam of wavelength $\lambda_c$, to illuminate the film 9. The polarizer 18 can also be placed against the right-hand electrode 7 in which case its orientation is immaterial.

The data to be stored and which are converted into optical form in the zone 21, are projected by the lens 22 onto the photoconductive film 8.

Thus, a light spot M produces an image at $M_1$ on the film 8. The corresponding spot $M_2$ on the film 9 then appears as a light spot. Even if the light beam coming from M is cut, the beam coming from the source 16 will continue to maintain the photoconductor in the conductive condition at the point $M_1$.

Since the liquid crystal used should be in the nematic condition, it is necessary to maintain it within a certain temperature range which defines this condition. For this purpose, it may be necessary to provide a temperature control system 23 which has been illustrated highly schematically here by a radiation heating device. Obviously, any other heating device could be provided.

Naturally, the device in accordance with the invention can be used for the point by point recording of binary information and for their storage, or can equally well be employed for direct viewing as a storage screen instead of a storage tube. The recorded image can then be that produced by a small cathode-ray tube whose screen is located at 21 and this image can then be recorded in one go or in staggered fashion (for example as in a sonar equipment).

What is claimed, is:

1. An optical information storing system comprising: a first constant thickness layer of a mixture of nematic liquid crystal and of a dichroic substance, said substance exhibiting at least one optical absorption line with respect to rectilinearly polarized light; a second constant thickness layer of photoconductive material located against said first layer; two transparent electrodes for enclosing said layers; first means for coupling said electrodes to a d.c. supply source; optical means for projecting said optical information onto said photoconductive layer; and second means for illuminating substantially uniformly said first layer by a beam of polarized light comprising at least a light radiation having a wavelength substantially equal to the wavelength of said absorption line, said photoconductive material being sensitive to radiation from said optical information projecting means and from said second means.

2. A system as claimed in claim 1 wherein said second means comprise a substantially monochromatic light source and a polarizer for supplying said beam with a rectilinear polarization in a direction parallel to said electrodes.

3. A system as claimed in claim 1 wherein at least one transparent insulating layer is located between said electrodes.

4. A system as claimed in claim 2 wherein at least one transparent insulating layer is located between said electrodes.

* * * * *